J. W. GAY.

Improvement in Muffs.

No. 5,108. Reissued Oct. 22, 1872.

Witnesses:

W. J. A. Fuller

Henry Schmitt

Inventor

John W. Gay

AM. PHOTO-LITHOGRAPHIC CO. N.Y. (OSBORNE'S PROCESS.)

UNITED STATES PATENT OFFICE.

JOHN W. GAY, OF BROOKLYN, NEW YORK, ASSIGNOR, BY MESNE ASSIGNMENTS, TO HIMSELF, SAMUEL N. KINGSBURY, EDWIN E. ABBOTT, ALEXANDER HULETT, DANIEL H. LAWRENCE, AND JOHN A. KINGSBURY.

IMPROVEMENT IN MUFFS.

Specification forming part of Letters Patent No. 41,766, dated March 1, 1864; reissue No. 5,108, dated October 22, 1872.

*To all whom it may concern:*

Be it known that I, JOHN W. GAY, of the city of Brooklyn, Kings county, New York, have invented certain Improvements in Muffs, of which the following is a specification:

My improvement relates to that class of muffs wherein the linings are of silk or other textile fabrics. The nature of my invention consists in the insertion in the lining, at each end of the opening through a muff, of a strip of fur, which assumes an annular shape, and which, by the operation of an elastic band, is made to clasp the wrist of a person using the muff with an elastic pressure, while at the same time the wrists are preserved from contact with the raw edge of the fur-skin and from the chafing or abrasion which would arise therefrom.

Figure 1:
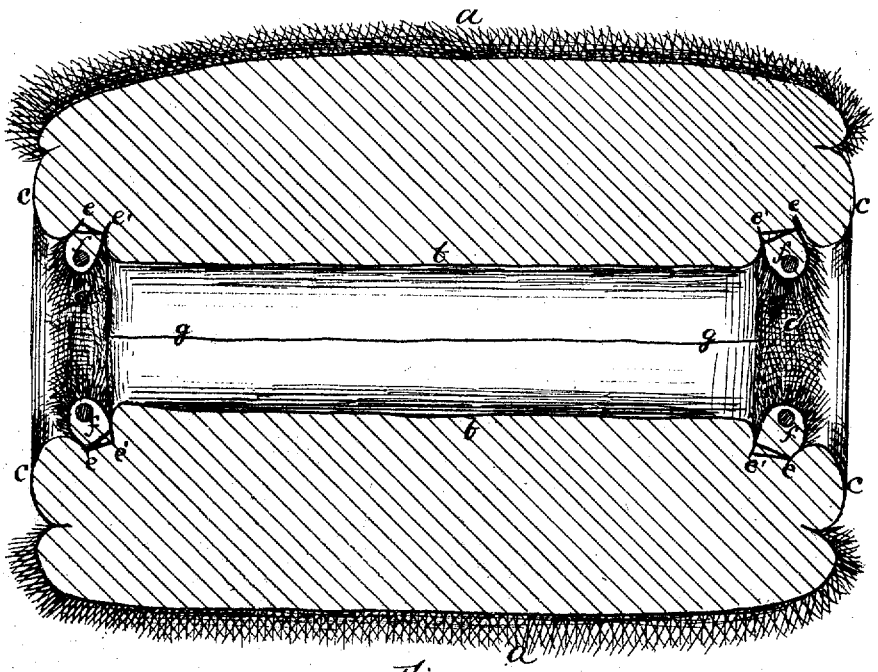
Figure 2:
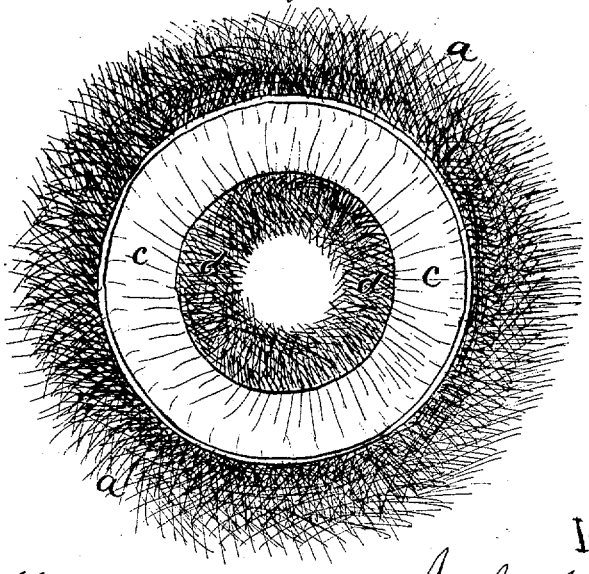

The drawing accompanying this specification, and making part of the same, embraces Figure 1, a longitudinal or axial section of a muff provided with my improvement; and Fig. 2, an end view of the same.

*a* is the plate or fur outside of the muff, the inside *b* and the ends *c c* being lined with silk. *d d* are the fur-bands, the edges of which are sewed to the edges of the inside and end linings, respectively, thus forming at each end of the muff the two seams *e* and *e'*. The elastic bands *f f* are placed, respectively, inside of the fur-bands, and are retained in their positions by long stitches taken to and from the seams *e* and *e'*.

Muffs have heretofore had strips of fur introduced at the middle of the inside; but such strips are liable to destruction by moths because not accessible for beating or brushing, and they do not prevent the admission of cold air around the wrists. Strips of fur have been sewed upon the outside of the end linings; but this mode of attaching them is awkward and troublesome, and at the best is especially objectionable because the raw edges of the fur-skin are liable to chafe the wrists of the person using the muff.

In my mode of construction the lining of the muff, as a whole, consists of three pieces of silk or other fabric and two strips of fur, which, in the process of manufacture, are laid out flat and sewed together at the edges so as to form the seams *e* and *e'* on either side of the fur strips. The pieces of silk forming the end linings are equal in length to the circumference of the outside of the muff, and in the process of being sewed to the fur-bands are gathered in so that their inner edges conform to the length of the fur strips. When thus sewed together the lining is doubled inside out and sewed longitudinally, forming the seams *g g*. The elastics are then slipped on over the fur-bands and the seams *e* and *e'* are loosely stitched together, so that the elastics are loosely contained between these stitches and the fur-skins *d d*.

It is important to avoid stitching through the elastic band itself, because that would impair its effectiveness by lessening its elasticity and decreasing its strength.

By my invention I have not only improved the quality and usefulness of the class of muffs to which it applies, but I have greatly increased the facility and economy of the manufacture.

I claim as my invention—

A fur-band inserted in the lining at each end of the opening through a muff, in combination with an elastic band, substantially as described, and for the purposes set forth.

JOHN W. GAY.

Witnesses:

W. J. A. FULLER,

HENRY SCHMITT.